United States Patent
Li et al.

(10) Patent No.: US 12,328,780 B2
(45) Date of Patent: Jun. 10, 2025

(54) DETERMINING ACTIVATION OF PACKET DATA CONVERGENCE PROTOCOL

(71) Applicant: Huawei Technologies Co., Ltd., Shenzhen (CN)

(72) Inventors: Xiangyu Li, Shanghai (CN); Wenjie Peng, Shanghai (CN); Jun Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 263 days.

(21) Appl. No.: 18/059,211

(22) Filed: Nov. 28, 2022

(65) Prior Publication Data

US 2023/0086128 A1 Mar. 23, 2023

Related U.S. Application Data

(63) Continuation of application No. PCT/CN2021/093973, filed on May 15, 2021.

(30) Foreign Application Priority Data

May 30, 2020 (CN) .......................... 202010480803.7

(51) Int. Cl.
*H04L 67/1095* (2022.01)
*H04W 64/00* (2009.01)
(Continued)

(52) U.S. Cl.
CPC ......... *H04W 76/14* (2018.02); *H04L 67/1095* (2013.01); *H04W 64/006* (2013.01); *H04W 74/0808* (2013.01)

(58) Field of Classification Search
CPC ..... H04L 67/1095; H04L 67/568; H04L 1/08; H04W 64/006; H04W 74/0808;
(Continued)

(56) References Cited

U.S. PATENT DOCUMENTS 10,536,878 B2   1/2020  Jheng et al.
2018/0368200 A1* 12/2018  Jin .......................... H04L 1/189
(Continued)

FOREIGN PATENT DOCUMENTS

CN   109983747    * 7/2019
CN   109983747 A    7/2019
(Continued)

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification(Release 16)," 3GPP TS 36.331 V16.0.0, Mar. 2020, 1048 pages.

(Continued)

*Primary Examiner* — Mewale A Ambaye
(74) *Attorney, Agent, or Firm* — SLATER MATSIL, LLP.

(57) ABSTRACT

In an embodiment a communication method includes receiving, by a terminal device, configuration information sent by a network device, wherein the configuration information comprises reliability information and channel busy ratio (CBR) information, wherein the reliability information comprises information indicating a reliability scope or level, and wherein the CBR information comprises information indicating a CBR scope or level, and determining, by the terminal device, a packet data convergence protocol duplication (PDCP) duplication processing operation based on service-related information and the configuration information, wherein the service-related information comprises information related to a service corresponding to a PDCP entity, and wherein the processing operation comprises an activation operation or a deactivation operation.

19 Claims, 4 Drawing Sheets

(51) Int. Cl.
*H04W 74/0808* (2024.01)
*H04W 76/14* (2018.01)

(58) Field of Classification Search
CPC ..... H04W 76/23; H04W 76/14; H04W 76/15; H04W 28/0289; H04W 28/0273
See application file for complete search history.

(56) References Cited

U.S. PATENT DOCUMENTS

| | | | |
|---|---|---|---|
| 2019/0215685 A1* | 7/2019 | Wang | H04W 4/40 |
| 2019/0239112 A1* | 8/2019 | Rao | H04L 1/08 |
| 2021/0400503 A1 | 12/2021 | Wang | |
| 2023/0036584 A1* | 2/2023 | Lee | H04L 1/1854 |

FOREIGN PATENT DOCUMENTS

| | | | | |
|---|---|---|---|---|
| EP | 3466151 A1 * | 4/2019 | ............... | H04L 1/08 |
| WO | 2019061194 A1 | 4/2019 | | |
| WO | 2019157689 A1 | 8/2019 | | |
| WO | 2020083086 A1 | 4/2020 | | |

OTHER PUBLICATIONS

"Summary of [99#48][eV2X] Selection of Tx carriers," Agenda Item: 9.10.2, Source: Huawei (rapporteur), Document for: Discussion and Decision, 3GPP TSG-RAN WG2 Meeting #99bis, R2-1710089, Prague, Czech Republic, Oct. 9-13, 2017, 26 pages.

"Considerations on PDCP duplication enhancements," Agenda item: 11.7.4, Source: CMCC, Document for: Discussion, 3GPP TSG-RAN WG2 Meeting #106, R2-1905936 (Resubmission of R2-1904358), Reno, NV, USA, May 12-16, 2019, 7 pages.

* cited by examiner

| R | R | R | Destination index | | | | | Oct 1 |
|---|---|---|---|---|---|---|---|---|
| $D_7$ | $D_6$ | $D_5$ | $D_4$ | $D_3$ | $D_2$ | $D_1$ | $D_0$ | Oct 2 |
| $RLC_1$ | $RLC_2$ | $RLC_3$ | $RLC_4$ | R | R | R | R | Oct 3 |

FIG. 4

| $I_8$ | $I_7$ | $I_6$ | $I_5$ | $I_4$ | $I_3$ | $I_2$ | $I_1$ | Oct 1 |
|---|---|---|---|---|---|---|---|---|
| $I_{16}$ | $I_{15}$ | $I_{14}$ | $I_{13}$ | $I_{12}$ | $I_{11}$ | $I_{10}$ | $I_9$ | Oct 2 |
| $I_{24}$ | $I_{23}$ | $I_{22}$ | $I_{21}$ | $I_{20}$ | $I_{19}$ | $I_{18}$ | $I_{17}$ | Oct 3 |
| $I_{32}$ | $I_{31}$ | $I_{30}$ | $I_{29}$ | $I_{28}$ | $I_{27}$ | $I_{26}$ | $I_{25}$ | Oct 4 |
| $D_7$ | $D_6$ | $D_5$ | $D_4$ | $D_3$ | $D_2$ | $D_1$ | $D_0$ | Oct 5 |
| $RLC_1$ | $RLC_2$ | $RLC_3$ | $RLC_4$ | R | R | R | R | Oct 6 |

DETERMINING ACTIVATION OF PACKET DATA CONVERGENCE PROTOCOL

CROSS-REFERENCE TO RELATED APPLICATIONS

This application is a continuation of International Application No. PCT/CN2021/093973, filed on May 15, 2021, which claims priority to Chinese Patent Application No. 202010480803.7, filed on May 30, 2020. The disclosures of the aforementioned applications are incorporated herein by reference in their entireties.

TECHNICAL FIELD

This application relates to the communications field, and more specifically, to a communication method, an apparatus, and a system.

BACKGROUND

Packet data convergence protocol (PDCP) duplication means that a PDCP packet is delivered to two radio link control (RLC) entities for transmission. The two RLC entities perform processing separately, and deliver processed packets to a media access control (MAC) layer through two corresponding logical channels (LCH). Currently, a method for determining activation of the PDCP duplication in a conventional technology is not sufficiently flexible and accurate. To ensure transmission reliability, how to flexibly and accurately determine whether to activate the PDCP duplication is an urgent problem to be resolved.

SUMMARY

This application provides a communication method and a communication apparatus, to resolve a conventional-technology problem that a method for determining activation of PDCP duplication is not sufficiently flexible and accurate.

According to a first embodiment, a communication method is provided, and includes: A terminal device receives configuration information sent by a network device, where the configuration information includes reliability information and channel busy ratio (CBR) information, the reliability information includes information indicating a reliability scope or level, and the CBR information includes information indicating a CBR scope or level. The terminal device determines a packet data convergence protocol duplication PDCP duplication processing operation based on service-related information and the configuration information, where the service-related information includes information related to a service corresponding to a PDCP entity, and the processing operation includes an activation operation or a deactivation operation.

According to the method, PDCP duplication processing information can be configured between the terminal device and the network device. The terminal device can more accurately control activation or deactivation of PDCP duplication based on the configuration information, to ensure transmission reliability based on a change of a CBR of a resource pool in mode 2 more flexibly. For example, the terminal device determines, depending on whether a value of the service-related information falls within a value scope in the configuration information, whether to perform the PDCP duplication activation operation.

In a possible design, the configuration information further includes speed information, and the speed information includes information indicating a speed scope or level of the terminal device. In the foregoing design, the terminal device can more flexibly control activation or deactivation of the PDCP duplication based on a speed of the terminal device and the speed scope or level information in the configuration information.

In a possible design, the service-related information includes reliability information of the service corresponding to the PDCP entity and CBR information of a resource pool corresponding to a current service of the terminal device. According to the foregoing design, the terminal device can determine, from two dimensions: a reliability requirement and the CBR information of the resource pool, whether to activate the PDCP duplication, so that whether to activate the PDCP duplication is accurately determined. This ensures sidelink (SL) transmission reliability.

In another possible design, the service-related information further includes the speed information of the terminal device. The terminal device may determine, with reference to the reliability requirement and/or the CBR information of the resource pool and from a dimension: the speed information, whether to activate the PDCP duplication, so that whether to activate the PDCP duplication is accurately determined. This ensures SL transmission reliability.

In another possible design, the service-related information further includes PDCP duplication indication information in a sidelink radio bearer (SLRB) configuration. The terminal device determines, based on an activation operation or a deactivation operation that is indicated by the indication information, whether to activate the PDCP duplication, so that determining accuracy can be improved with reference to multi-dimensional information.

In a possible design, the reliability information includes at least one reliability scope or level, the CBR information includes at least one CBR scope or level, and there is a correspondence between the reliability scope or level and the CBR scope or level. In other words, the terminal device may determine, based on different reliability requirements, a CBR scope that satisfies a condition for activating the PDCP duplication, to more flexibly determine whether to activate the PDCP duplication.

The foregoing service corresponding to the PDCP entity may be understood as that a corresponding service that is transmitted on the PDCP entity, where the service includes one or more of a data packet and a quality of service flow that are mapped to the PDCP entity.

Optionally, the configuration information is carried in a system information broadcast (SIB) message, a radio resource control (RRC) dedicated message, or a preconfigured message.

According to a second embodiment, a communication method is provided. In the method, a network device determines configuration information, where the configuration information includes reliability information and channel busy ratio CBR information, the reliability information includes information indicating a reliability scope or level, and the CBR information includes information indicating a CBR scope or level. The network device sends the configuration information to a terminal device.

According to the method, the network device configures the reliability scope and the CBR scope for the terminal device, to more accurately control activation and deactivation of SL duplication.

In a possible design, the configuration information further includes speed information, and the speed information includes information indicating a speed scope or level of the terminal device. The network device may control activation and deactivation of the SL duplication by configuring the speed scope or the speed level.

In a possible design, the reliability information includes at least one reliability scope or level, the CBR information includes at least one CBR scope or level, and there is a correspondence between the reliability scope or level and the CBR scope or level. In other words, the network device may configure a CBR scope that different reliability requirements need to satisfy, so that whether to activate PDCP duplication is more flexibly controlled.

Optionally, the configuration information is carried in a SIB message, an RRC dedicated message, or a preconfigured message.

According to a third embodiment, a communication method is provided. In the method, a terminal device receives first indication information sent by a network device, where the first indication information includes information indicating a PDCP duplication processing operation corresponding to a first radio link control (RLC) entity or a first logical channel that is associated with a first packet data convergence protocol PDCP entity, the first indication information includes RLC indication information, the RLC indication information includes information indicating the first RLC entity or the first logical channel, and the processing operation includes an activation operation or a deactivation operation. The terminal device performs the corresponding processing operation based on the first indication information.

According to the foregoing method, the terminal device can determine, based on the first indication information, an RLC entity or a logical channel for duplication. This not only ensures data transmission reliability, but also reduces data transmission resource overheads and complexity to some extent.

In a possible design, the first indication information further includes SLRB indication information and/or destination indication information, the SLRB indication information includes information indicating an applicable SLRB, and the destination indication information includes information indicating an applicable destination. In this way, the terminal device can determine the information about the applicable SLRB and/or the information about the applicable destination based on the first indication information.

Optionally, the first indication information is carried in a media access control control element (MAC control element, MAC CE).

According to a fourth embodiment, a communication method is provided. In the method, a network device sends first indication information to a terminal device, where the first indication information includes information indicating a PDCP duplication processing operation corresponding to a first RLC entity or a first logical channel that is associated with a first PDCP entity.

The first indication information includes RLC indication information, the RLC indication information includes information indicating the first RLC entity or the first logical channel, and the processing operation includes a PDCP duplication activation or deactivation operation.

According to the foregoing method, the network device can flexibly control, based on the first indication information, an RLC entity or a logical channel for duplication. This not only ensures data transmission reliability, but also reduces data transmission resource overheads and complexity to some extent.

In a possible design, the first indication information further includes SLRB indication information and/or destination indication information, the SLRB indication information includes information indicating an applicable SLRB, and the destination indication information includes information indicating an applicable destination. In this way, the terminal device can determine the information about the applicable SLRB and/or the information about the applicable destination based on the first indication information.

Optionally, the first indication information is carried in a media access control control element MAC CE.

According to a fifth embodiment, a communication apparatus is provided. The apparatus may be a terminal device, or may be a chip used in the terminal device. The apparatus has a function of implementing the first embodiment, the third embodiment, the possible designs of the first embodiment, or the possible designs of the third embodiment. The function may be implemented by using hardware, or may be implemented by the hardware executing corresponding software. The hardware or the software includes one or more modules corresponding to the foregoing function.

According to a sixth embodiment, a communication apparatus is provided. The apparatus may be a network device, or may be a chip used in the network device. The apparatus has a function of implementing the second embodiment, the fourth embodiment, the possible designs of the second embodiment, or the possible designs of the fourth embodiment. The function may be implemented by using hardware, or may be implemented by the hardware executing corresponding software. The hardware or the software includes one or more modules corresponding to the foregoing function.

According to a seventh embodiment, this application provides a chip system. The chip system includes a processor, configured to implement functions of the terminal device in the methods in the foregoing embodiments. In a possible design, the chip system further includes a memory, configured to store program instructions and/or data. The chip system may include a chip, or may include the chip and another discrete component.

According to an eighth embodiment, this application provides a chip system. The chip system includes a processor, configured to implement functions of the network device in the methods in the foregoing embodiments. In a possible design, the chip system further includes a memory, configured to store program instructions and/or data. The chip system may include a chip, or may include the chip and another discrete component.

According to a ninth embodiment, a computer-readable storage medium is provided. The computer-readable storage medium stores program code. The program code includes instructions for performing the communication methods in the foregoing embodiments.

For example, the computer-readable medium may store program code, and the program code includes instructions for performing the communication method in the first embodiment.

For example, the computer-readable medium may store program code, and the program code includes instructions for performing the communication method in the second embodiment.

For example, the computer-readable medium may store program code, and the program code includes instructions for performing the communication method in the third embodiment.

For example, the computer-readable medium may store program code, and the program code includes instructions for performing the communication method in the fourth embodiment.

According to a tenth embodiment, this application provides a computer program product including instructions. When the computer program product runs on a computer, the computer is enabled to perform the instructions of the methods in the foregoing embodiments.

According to an eleventh embodiment, a communication system is provided, and includes any one or more of the foregoing communication apparatuses.

DETAILED DESCRIPTION OF ILLUSTRATIVE EMBODIMENTS

The following describes technical solutions in this application with reference to accompanying drawings. For example, features or content marked by dashed lines in the accompanying drawings in embodiments of this application may be understood as optional operations or optional structures of embodiments.

The technical solutions in embodiments of this application may be applied to various communication systems, such as a long term evolution (LTE) system, an LTE frequency division duplex (FDD) system, an LTE time division duplex (TDD) system, a universal mobile telecommunication system (UMTS), a worldwide interoperability for microwave access (WiMAX) communication system, a future fifth generation (5G) mobile communication system, or a new radio access technology (NR) system. The 5G mobile communication system may include a non-standalone (NSA) communication system and/or a standalone (SA) communication system.

The technical solutions provided in this application may be further applied to machine type communication (MTC), long term evolution-machine (LTE-M), a device to device (D2D) network, a machine to machine (M2M) network, an internet of things (IoT) network, or another network. The IoT network may include, for example, an internet of vehicles. Communication modes in an internet of vehicles system are collectively referred to as vehicle to X (V2X, where X may represent anything). For example, V2X may include vehicle to vehicle (V2V) communication, vehicle to infrastructure (V2I) communication, vehicle to pedestrian (V2P) communication, vehicle to network (V2N) communication, or the like.

The technical solutions provided in this application may be further applied to a future communication system, for example, a sixth generation mobile communication system. This is not limited in this application.

V2X is an important key technology that implements environment sensing, information exchange, and collaborative control by using a sensor, an electronic label, and the like that are mounted on a vehicle. For example, the technology may implement vehicle to network (V2N), vehicle to vehicle (V2V), vehicle to pedestrian (V2P), and vehicle to infrastructure (V2I) information exchange, and the like, and improve an intelligence level and a self-driving capability of the vehicle.

Both participants of V2V are terminal devices. V2V may be for information exchange and reminding between vehicles, and most typical application is an anti-collision safety system between the vehicles.

Both participants of V2P are terminal devices. V2P may be for providing a safety warning for a pedestrian or a non-motor vehicle on a road.

In V2I, one participant is a terminal device, and the other participant is an infrastructure (or a road facility). V2I may be for communication between a vehicle and the infrastructure. For example, the infrastructure may be a road, a traffic light, a barricade, or the like, and road management information such as a time sequence of a traffic light signal may be obtained.

In embodiments of this application, a network device may be any device having a wireless transceiver function. The device includes but is not limited to an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission point (TP), a transmission and reception point (TRP), or the like, may be a gNB or a transmission point (TRP or TP) in a 5G system such as an NR system or an antenna panel or a group (including a plurality of antenna panels) of antenna panels of a base station in the 5G system, or may be a network node, for example, a baseband unit (BBU) or a distributed unit (DU), that constitutes a gNB or a transmission point.

In some deployments, the gNB may include a central unit (CU) and the DU. The gNB may further include an active antenna unit (AAU). The CU implements some functions of the gNB, and the DU implements some functions of the gNB. For example, the CU is responsible for processing a non-real-time protocol and service, and implements functions of a radio resource control (RRC) layer and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer is eventually converted into information at the PHY layer, or is converted from information at the PHY layer. Therefore, in this architecture, higher layer signaling such as RRC layer signaling may also be considered as being sent by the DU or sent by the DU and the AAU. It may be understood that the network device may be a device including one or more of a CU node, a DU node, and an AAU node. In addition, the CU may be classified as a network device in an access network (RAN), or may be classified as a network device in a core network (CN). This is not limited in embodiments of this application.

In embodiments of this application, a terminal device may be referred to as user equipment (UE), a terminal, a mobile station (MS), a mobile terminal, and the like. The terminal device may further communicate with one or more core networks through a radio access network (RAN). The terminal device may also be referred to as an access terminal, a subscriber unit, a subscriber station, the mobile station, a remote station, a remote terminal, a mobile device, a user terminal, the terminal, a wireless communication device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a vehicle having a communication function, a wearable device, a terminal device in a future 5G network, and the like. This is not limited in embodiments of this application.

To facilitate understanding of embodiments of this application, the following first explains and describes technical terms in embodiments of this application. It should be noted that the following technical terms do not constitute any limitation on the prior art of embodiments of this application, and descriptions of these technical terms also include the summary of embodiments of this application.

1. Packet Data Convergence Protocol (PDCP) Duplication

The PDCP duplication means that a PDCP packet is delivered to two radio link control (RLC) entities for transmission. The two RLC entities perform processing separately, and deliver processed packets to a media access control (MAC) layer through two corresponding logical channels (LCH). From the perspective of the MAC layer, there are two independent packets. The MAC cannot identify whether the packets are packets transmitted through the PDCP duplication. The MAC layer only needs to schedule the packets according to a normal algorithm. For example, for PDCP duplication based on carrier aggregation (CA), LCHs corresponding to two associated RLC entities transmit corresponding data packets based on different carriers. In this way, data transmission reliability can be greatly improved based on a gain brought by frequency domain diversity.

In a conventional technology, in a possible solution, activation and deactivation of the PDCP duplication are determined based on a ProSe per-packet reliability (PPPR) value (where a smaller value indicates a higher reliability requirement) associated with a data packet mapped to a sidelink radio bearer (SLRB) and a configured PPPR threshold. In other words, the PPPR value associated with the data packet is compared with the PPPR threshold, and whether to activate the PDCP duplication is determined based on a comparison result. For example, when the PPPR value associated with the data packet mapped to the SLRB is less than the PPPR threshold, in other words, when a reliability requirement is high, the SLRB needs to perform a PDCP duplication operation. In this manner, transmission reliability cannot be ensured based on a change of a CBR of a resource pool in mode 2 flexibly.

In another possible solution in a conventional technology, activation and deactivation of the PDCP duplication may be determined by using indication information in an SLRB configuration or a media access control control element (MAC CE). Specifically, the following two possible manners are included.

Manner 1: Whether to perform activation is determined based on activation configuration information (for example, a pdcp-Duplication configuration) in a PDCP entity configuration. Specifically, if the activation configuration information indicates activation, a PDCP duplication activation operation is performed; or if the activation configuration information indicates deactivation, a PDCP duplication deactivation operation is performed.

Manner 2: Whether to perform activation is determined based on indication information (for example, duplication activation or deactivation information in the MAC CE (Duplication activation/Deactivation MAC CE)) in the MAC CE. Specifically, the MAC CE indicates a data radio bearer (DRB) for which the PDCP duplication needs to be activated.

The foregoing two solutions cannot well resolve a problem of how to flexibly and accurately control the PDCP duplication when the reliability requirement is not high or carrier load of a part of logical channels is heavy.

2. Channel Busy Ratio (CBR)

SL PDCP duplication is mainly for ensuring actual reliability of SL transmission. For the mode 2, reliability assurance is not only affected by a reliability requirement (for example, reflected by parameters such as a packet error rate, a communication range, and a PC5 5G quality of service identifier) corresponding to a service (or a QoS flow), but also affected by the CBR of the resource pool. For example, even if there is a same reliability requirement for data sending, actual reliability that can be finally achieved is different if a same transmission technology is used when CBRs are different. Particularly, in mode 2, a duplication activation status configured for a sidelink bearer is at a per cell level, and CBRs of resource pools of all terminal devices that perform SL communication in a cell are probably different.

Figure 1:
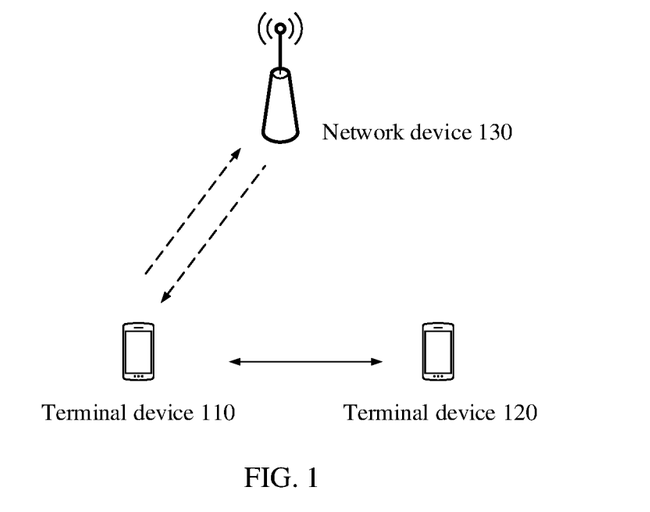
FIG. 1 is a schematic diagram of a possible communication system according to an embodiment of this application.

FIG. 1 is a schematic diagram of a V2X communication architecture. As shown in FIG. 1, a system includes at least two terminal devices (for example, a terminal device 110 and a terminal device 120) and one network device 130. The terminal device 110 may perform transmission with the terminal device 120 through a PC5 interface, and the network device 130 may communicate with the terminal device 110 through a Uu interface. The PC5 interface is a direct communication interface between terminal devices having a V2X communication function, and a direct communication link between the terminal devices having the V2X communication function is also defined as a sidelink (SL).

It should be understood that communication methods provided in this application may be applied to the system shown in FIG. 1. For example, a terminal device may correspond to the terminal device 110 in FIG. 1, and a network device may correspond to the network device 130 in FIG. 1. The following describes the communication methods provided in this application.

It should be further understood that interaction between the network device and the terminal device is used as an example in the following embodiments to describe in detail the methods provided in embodiments of this application. However, this shall not constitute any limitation on this application. For example, the terminal device shown in the following embodiments may be replaced with a component (for example, a chip, a chip system, or a circuit) configured in the terminal device. The network device shown in the following embodiments may alternatively be replaced with a component (for example, a chip, a chip system, or a circuit) configured in the network device. Specific structures of execution bodies of the methods provided in embodiments of this application are not particularly limited in the following embodiments, provided that a program that records code of the methods provided in embodiments of this application can be run to perform communication according to the methods provided in embodiments of this application. For example, the methods provided in embodiments of this application may be performed by the terminal device or the network device, or a function module that can invoke and execute the program in the terminal device or the network device.

This application provides the following communication methods to resolve a conventional-technology problem that a method for determining activation of PDCP duplication is not sufficiently flexible and accurate.

Figure 2:
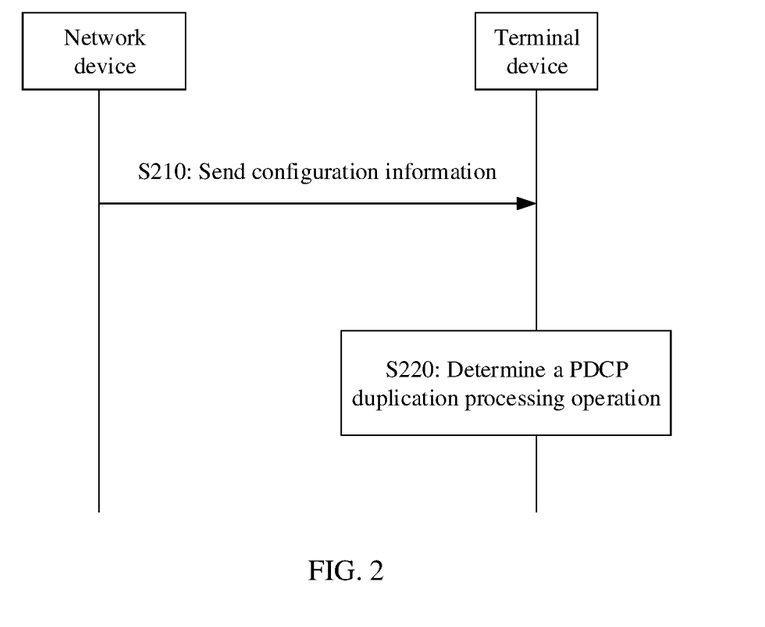
FIG. 2 is a schematic flowchart of a possible communication method according to an embodiment of this application.

FIG. 2 is a schematic flowchart of a communication method according to this application. The following describes steps in the method 200 shown in FIG. 2.

S210: A network device sends configuration information to a terminal device. Accordingly, the terminal device receives the configuration information sent by the network device.

The configuration information may include reliability information and channel busy ratio CBR information. The reliability information includes information indicating a reliability scope or level. The CBR information includes information indicating a CBR scope or level. In this embodiment of this application, the reliability information may be one or more of information such as a packet error rate (PER), a communication range, and a PC5 5G quality of service identifier (PQI). The CBR information may be a CBR of a sending resource pool. It should be understood that the CBR of the resource pool is a CBR of a corresponding resource pool actually used by the terminal device to send data.

Optionally, the information included in the configuration information in this embodiment of this application may be implemented in a plurality of manners. In other words, there are a plurality of different implementations of the configuration information. For example, the configuration information may be implemented in a form of a table, or may be implemented in a form of a function. The configuration information may be dynamically indicated or semi-statically indicated. This is not limited in this embodiment of this application.

Optionally, the configuration information may further include speed information, and the speed information includes information indicating a speed scope or a speed level of the terminal device. It is easy to understand that the speed information may be absolute speed information, or may be relative speed information. The speed information may alternatively be sent to the terminal device via another message. This is not limited in this application.

The reliability information is used as an example. The following describes possible implementations of indicating the reliability scope or level. Further, possible manners of indicating a PER scope or level are described by using an example in which reliability is reliability of a packet error rate (PER) of a quality of service (QoS) flow mapped to a PDCP entity.

In a possible manner of indicating the PER scope or level, the PER scope is indicated by using two PER thresholds (a and b). In other words, the indicated PER scope is greater than or equal to a and less than or equal to b, where 0<a<b. For example, if the PER thresholds are 0.02 and 0.03, it indicates that the indicated PER scope is 0.02 to 0.03. It should be understood that the PER thresholds may be configured by the network device, for example, by using a system information block (SIB) message.

In another possible manner of indicating the PER scope or level, the PER scope is indicated by using one PER threshold (c). In other words, the indicated PER scope is greater than 0 and less than or equal to c, where 0<c. For example, if the PER threshold is 0.01, it indicates that the indicated PER scope is 0 to 0.01. It should be understood that the PER threshold may be configured by the network device, for example, by using a system information block SIB message.

In still another possible manner of indicating the PER scope or level, the PER level is indicated by using the configuration information. In other words, the configuration information carries indication information indicating the PER level. It is easy to understand that PER levels may be classified based on PER scopes. In other words, there is a correspondence between the PER level and the PER scope. One PER level corresponds to one PER scope. The correspondence may be predefined in a protocol, may be determined by a network side device, or may be determined by the terminal device.

The foregoing uses the implementations of indicating PER scope or level information as an example to describe implementations of indicating a scope or a level. It is easy to understand that, for indication of other reliability information such as the CBR information and the speed information, refer to the implementations of indicating the PER scope or level. Details are not described again in this application.

In a possible design, the reliability information includes at least one reliability scope or level, the CBR information includes at least one CBR scope or level, and there is a correspondence between the reliability scope or level and the CBR scope or level. In other words, different reliability scopes may correspond to different CBR scopes that satisfy a condition for activating PDCP duplication, to more flexibly determine whether to activate the PDCP duplication. It may be understood that there are a plurality of different implementations of the correspondence. For example, the correspondence may be implemented in a form of a table, may be implemented in a form of a function, or may be implemented by using another data structure. For example, the correspondence may be implemented by using an array, a queue, a container, a stack, a linear table, a pointer, a linked list, a tree, a graph, a structure, a class, a pile, a hash table, or the like.

For example, a correspondence between the PER scope and the CBR scope may be shown in Table 1.

TABLE 1

| PER scope 1 | CBR scope 1 |
| PER scope 2 | CBR scope 2 |
| PER scope 3 | CBR scope 3 |
| PER scope 4 | CBR scope 4 |

In Table 1, one PER scope is associated with one corresponding CBR scope. In other words, corresponding CBR scopes may be configured for different reliability requirement scopes. It is easy to understand that scope information in Table 1 may alternatively be level information. In other words, one PER level is associated with one corresponding CBR level.

In another possible design, the configuration information includes the reliability information, the CBR information, and the speed information. The reliability information includes at least one reliability scope or level, the CBR information includes at least one CBR scope or level, the speed information includes at least one speed scope or level, and there is a correspondence between the reliability scope or level, the CBR scope or level, and the speed scope or level. In other words, the configuration information indicates the reliability information, the CBR information, and the speed information that are associated with each other.

For example, a correspondence between the PER scope, the CBR scope, and the speed scope may be shown in Table 2.

TABLE 2

| PER scope 1 | CBR scope 1 | Speed scope 1 |
| PER scope 2 | CBR scope 2 | Speed scope 2 |
| PER scope 3 | CBR scope 3 | Speed scope 3 |
| PER scope 4 | CBR scope 4 | Speed scope 4 |

In Table 2, one PER scope is associated with one corresponding CBR scope and speed scope. In other words, corresponding CBR scopes and speed scopes may be configured for different reliability requirement scopes. It is easy to understand that scope information in Table 1 may alternatively be level information. In other words, one PER level is associated with one corresponding CBR level and speed level.

In another possible design, the configuration information includes the CBR information. The CBR information indicates the CBR scope or level.

S220: The terminal device determines a PDCP processing operation based on service-related information and the configuration information, where the processing operation includes an activation operation or a deactivation operation.

It is easy to understand that the terminal device may determine the PDCP processing operation based on a plurality of pieces of service-related information and a plurality of pieces of scope or level information in the configuration information, so that the terminal device flexibly and accurately determines the PDCP processing operation based on different service scenarios and service requirements.

For example, this embodiment of this application describes several possible manners in which the terminal device determines the PDCP duplication processing operation.

In a possible manner of determining the PDCP processing operation, when a reliability requirement satisfies a condition 1, and the CBR of the resource pool satisfies a condition 2, the terminal device determines to activate the duplication operation of the corresponding PDCP entity.

It should be understood that, that a reliability requirement satisfies a condition 1 means that a reliability requirement of a PC5 QoS flow satisfies the condition 1. Further, in a possible design, that a reliability requirement of a PC5 QoS flow satisfies the condition 1 means that a reliability requirement corresponding to one QoS flow in one or more QoS flows mapped to a corresponding SLRB (or the PDCP entity) satisfies the condition 1. In another possible design, that a reliability requirement of a PC5 QoS flow satisfies the condition 1 means that reliability requirements corresponding to all QoS flows in one or more QoS flows mapped to a corresponding SLRB (or the PDCP entity) all satisfy the condition 1.

Optionally, the condition 1 may be a PQI of the QoS flow mapped to the PDCP entity. Optionally, the PQI belongs to a configured PQI list. The PQI is a PC5 QoS parameter, and the PQI may be mapped into one or more QoS features in a resource type, a priority level, a packet delay budget (PDB), a PER, an averaging window, and a maximum data burst volume (MDBV).

Optionally, the condition 1 may be that the PER of the QoS flow mapped to the PDCP entity falls within the PER scope in the configuration information. Alternatively, when the configuration information includes level information of the PER, a level of the PER satisfies a requirement of the PER level in the configuration information. It is easy to understand that the condition 1 may limit one or more of QoS features, and that the PER falls within the PER scope in the configuration information is merely an example.

Optionally, the condition 1 may be that a PQI of the QoS flow mapped to the PDCP entity belongs to a configured PQI list and a communication range of the QoS flow mapped to the PDCP entity falls within a range scope in the configuration information. Alternatively, when the configuration information includes level information of a range, a level of the range satisfies a requirement of a range level in the configuration information.

Optionally, the condition 1 may be that the PER of the QoS flow mapped to the PDCP entity falls within the PER scope in the configuration information and a communication range range of the QoS flow mapped to the PDCP entity falls within a range scope in the configuration information. Alternatively, when the configuration information includes level information of the PER, a level of the PER satisfies a requirement of the PER level in the configuration information. Alternatively, when the configuration information includes level information of a range, a level of the range satisfies a requirement of a range level in the configuration information. It is easy to understand that the condition 1 may limit one or more of QoS features, and that the PER falls within the PER scope in the configuration information is merely an example.

That the CBR of the resource pool satisfies a condition 2 means that the CBR that is of the resource pool and that is obtained by the terminal device through measurement falls within the CBR scope. In other words, the CBR that is of the resource pool and that is obtained by the terminal device through measurement falls within the CBR scope included in the configuration information. Alternatively, when the configuration information includes level information of the CBR, a level of the CBR satisfies a requirement of the CBR level in the configuration information.

It is easy to understand that there may be a plurality of reliability scopes or levels and CBR scopes or levels in the configuration information. In other words, there may be a plurality of conditions 1 and a plurality of conditions 2. That a reliability requirement satisfies a condition 1 and the CBR of the resource pool satisfies a condition 2 means that when the condition 1 is satisfied, the corresponding condition 2 needs to be satisfied, and the terminal device can determine to activate the duplication operation of the corresponding PDCP entity. For example, as shown in Table 1, there is a correspondence between the PER scope 1 and the CBR scope 1. When a value of the PER of the terminal device falls within the PER scope 1, and the CBR that is of the resource pool and that is obtained by the terminal device through measurement falls within the CBR scope 1, the terminal device determines to activate the duplication operation of the corresponding PDCP entity. In this manner, the terminal device ensures transmission reliability based on a change of the CBR of the resource pool in mode 2 more flexibly.

In another possible manner of determining the PDCP processing operation, when a reliability requirement satisfies a condition 1, the terminal device determines to activate the duplication operation of the corresponding PDCP entity. For example, when a value of the PER of the terminal device falls within the PER scope, in other words, when the reliability requirement of the terminal device falls within the reliability scope included in the configuration information, the terminal device determines to activate the PDCP duplication.

In still another possible manner of determining the PDCP processing operation, that the speed of the terminal device satisfies a condition 3 is further included. In other words, the PDCP duplication is activated only when all three conditions are satisfied. The three conditions are as follows: A reliability requirement satisfies a condition 1, the CBR of the resource pool satisfies a condition 2, and the speed of the terminal device satisfies the condition 3. That the speed of the terminal device satisfies the condition 3 means that the speed of the terminal device falls within the speed scope included in the configuration information or when the configuration information includes level information of a speed, the speed level of the terminal device satisfies a requirement of the speed level in the configuration information. It should be understood that the speed may be an absolute speed of the terminal device, or may be a relative speed of the terminal device relative to another terminal device. In this manner, the terminal device flexibly determines the PDCP duplication activation operation based on the reliability requirement corresponding to the QoS flow, a change of the CBR of the resource pool, and the speed information of the terminal device, to ensure transmission reliability and flexibility.

In yet another possible manner of determining the PDCP processing operation, when the CBR of the resource pool satisfies a condition 2 and a condition 4, the terminal device determines to activate the PDCP duplication. Satisfying the condition 4 means that duplication in an SLRB configuration indicates an activated state. In other words, the terminal device determines, based on the condition 2 and the condition 4, whether to activate the PDCP duplication. For example, the terminal device determines, based on the activated state indicated by the duplication in the SLRB configuration and because the CBR that is of the resource pool and that is obtained by the terminal device through measurement falls within the CBR scope, to activate the PDCP duplication. In this manner, the terminal device flexibly determines the PDCP duplication activation operation based on a change of the CBR of the resource pool and SLRB configuration information, to ensure transmission reliability and flexibility.

One PDCP entity in PDCP duplication is associated with a plurality of RLC entities or LCHs. Carriers associated with some of the plurality of LCHs may correspond to different load, or data transmitted on a current SLRB corresponds to different reliability requirements. How to ensure SL communication reliability by flexibly adjusting a quantity of RLC entities or LCHs for which duplication is actually activated in the plurality of RLC entities or LCHs becomes an urgent problem to be resolved.

Figure 3:
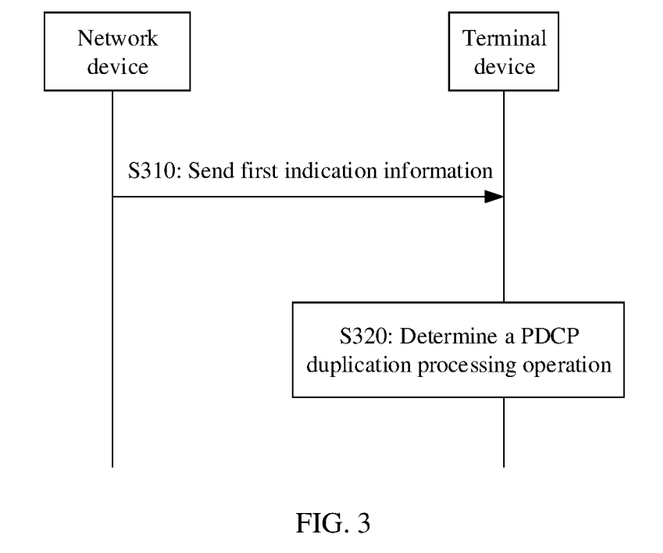
FIG. 3 is a schematic flowchart of a possible communication method according to an embodiment of this application.

An embodiment of this application provides a method for flexibly adjusting duplication activation statuses of a plurality of RLC entities or LCHs. Details are shown in FIG. 3.

S310: A network device sends first indication information to a terminal device, where the first indication information includes information indicating a PDCP duplication processing operation corresponding to a first radio link control RLC entity or a first logical channel that is associated with a first packet data convergence protocol PDCP entity.

The first indication information includes RLC indication information, the RLC indication information includes information indicating the first RLC entity or the first logical channel, and the processing operation includes a PDCP duplication activation or deactivation operation.

In a possible manner, the first indication information is carried in a media access control control element MAC CE. For example, the network device sends a sidelink activation/deactivation media access control control element (SL Duplication Activation/Deactivation MAC CE) to the terminal device.

Specifically, the MAC CE includes one or more of destination indication information, SLRB indication information, and RLC indication information. Optionally, the MAC CE further includes identification information (for example, a logical channel identifier (LCID)), and the identification information identifies the MAC CE.

The destination indication information indicates a destination to which the MAC CE is applicable. It should be understood that the MAC CE is applicable only to an SLRB corresponding to the destination corresponding to the destination indication information. Optionally, the destination indication information may include indication information of a plurality of destinations. Optionally, a specific representation form of the destination indication information may be a destination index or a bit map.

The SLRB indication information indicates an SLRB to which the MAC CE is applicable. It should be understood that the MAC CE is applicable only to the SLRB corresponding to SLRB indication information. Optionally, the SLRB indication information may include indication information of a plurality of SLRBs. Optionally, the SLRB indication information may be an SLRB index or a bit map, where the SLRB index is an index that is associated with an SLRB configuration and that is sent in a network.

The RLC indication information indicates an RLC entity (or an LCH) to which the MAC CE is applicable. It should be understood that the MAC CE is applicable only to the RLC entity corresponding to the RLC indication information. Optionally, the RLC indication information may include indication information of a plurality of RLC entities. Optionally, the RLC indication information may be an RLC index (RLC bearer config index) or a bit map, where the RLC index is an index that is associated with an RLC entity configuration and that is sent in the network.

Figure 4:
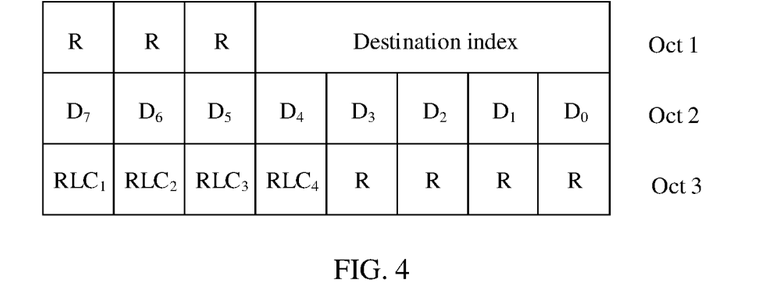
FIG. 4 is a schematic diagram of a possible MAC CE design according to an embodiment of this application.

For example, an embodiment of this application provides a specific MAC CE design method. As shown in FIG. 4, R is a reserved bit; the destination index indicates a destination ID to which the MAC CE is applicable; $D_n$ indicates an SLRB ID/index (where for example, when $D_n=1$, it indicates that PDCP duplication needs to be activated for an SLRB associated with $D_n$); and $RLC_n$ indicates an RLC bearer ID/index (where for example, when $RLC_1 1=$, $RLC_2=1$, $RLC_3=0$, and $RLC_4=0$, it indicates that the PDCP duplication needs to be activated only for RLC bearers that are identified by $RLC_1$ and $RLC_2$ and that are associated with the SLRB). It should be understood that $D_n$ may occupy more than eight bits. For example, $D_n$ may represent $D_0$ to $D_{15}$.

Figure 5:
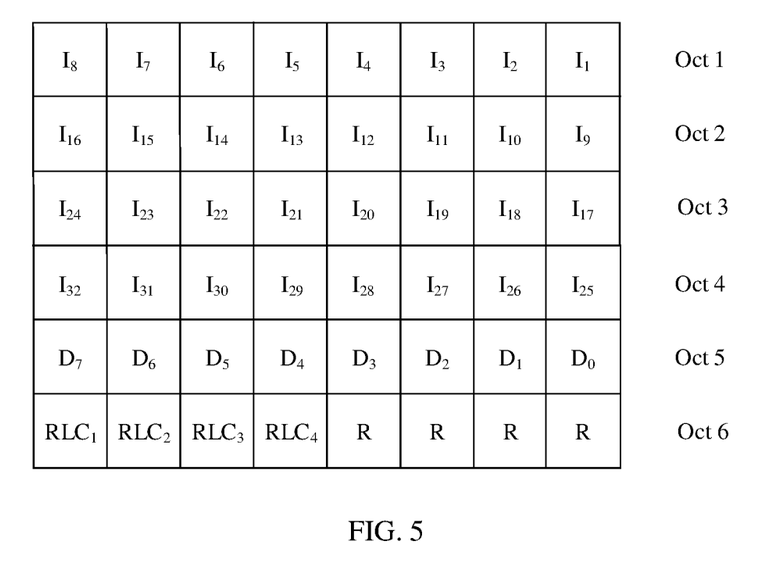
FIG. 5 is a schematic diagram of another possible MAC CE design according to an embodiment of this application.

There is another specific MAC CE design method. As shown in FIG. 5, R is a reserved bit; $I_n$ indicates a destination ID to which the MAC CE is applicable (where for example, $I_9=1$, indicating that PDCP duplication is needed for a destination ID associated with a destination index that is equal to 9); $D_n$ indicates an SLRB ID/index; and $RLC_n$ indicates an RLC bearer ID/index. It should be understood that $D_n$ may occupy more than eight bits. For example, $D_n$ may represent $D_0$ to $D_{15}$.

S320: The terminal device performs the corresponding processing operation based on the first indication information.

The terminal device determines, based on the first indication information, the PDCP duplication processing operation corresponding to the first radio link control RLC entity or the first logical channel that is associated with the first packet data convergence protocol PDCP entity.

For example, the terminal device determines, based on the first indication information, that the PDCP duplication processing operation needs to be performed on the first RLC entity or the first logical channel that is associated with the first PDCP entity. Specifically, the terminal device may determine, based on an indication of the MAC CE, an RLC entity/LCH on which PDCP duplication processing needs to be performed. According to the method, the terminal device can flexibly determine, based on the first indication information in a plurality of RLC entities or logical channels that are associated with the first PDCP entity, which entities need the PDCP duplication and which entities do not need the duplication, so that transmission reliability and flexibility are ensured.

It may be understood that, in the foregoing method embodiments of this application, these steps or operations are merely examples. In embodiments of this application, other operations or variations of various operations may be further performed. In addition, the steps may be performed in a sequence different from a sequence presented in embodiments of this application, and not all operations in embodiments of this application may be performed.

It may be understood that, in the foregoing embodiments of this application, the method implemented by the terminal device may alternatively be implemented by a component (for example, a chip or a circuit) that may be configured in the terminal device, and the method implemented by the network device may alternatively be implemented by a component (for example, a chip or a circuit) that may be configured in the network device. In addition, the network device may also be referred to as a first node, and the network device may be a base station, may be a DU or a CU, or may be in another network form.

The foregoing mainly describes the solutions provided in embodiments of this application from a perspective of interaction between the network elements. Correspondingly, embodiments of this application further provide a communication apparatus, and the communication apparatus is configured to implement the foregoing various methods. The communication apparatus may be the terminal device in the foregoing method embodiments, an apparatus including the foregoing terminal device, or a component (a chip or a circuit) that may be used in the terminal device. Alternatively, the communication apparatus may be the network device in the foregoing method embodiments, an apparatus including the foregoing network device, or a component that may be used in the network device. It may be understood that, to implement the foregoing functions, the communication apparatus includes a corresponding hardware structure and/or software module for performing the functions. A person skilled in the art should be quite easily aware that, in combination with the examples described in embodiments disclosed in this specification, units and algorithm steps can be implemented by hardware or a combination of hardware and computer hardware in this application. A person skilled in the art may use different methods to implement the functions for each particular application, but it should not be considered that the implementation goes beyond the scope of this application.

In embodiments of this application, the communication apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module.

Apparatuses provided in embodiments of this application are described below in detail with reference to FIG. 6 to FIG. 8. It should be understood that descriptions of apparatus embodiments correspond to the descriptions of the method embodiments. Therefore, for content that is not described in detail, refer to the foregoing method embodiments. For brevity, some content is not described again.

Figure 6:
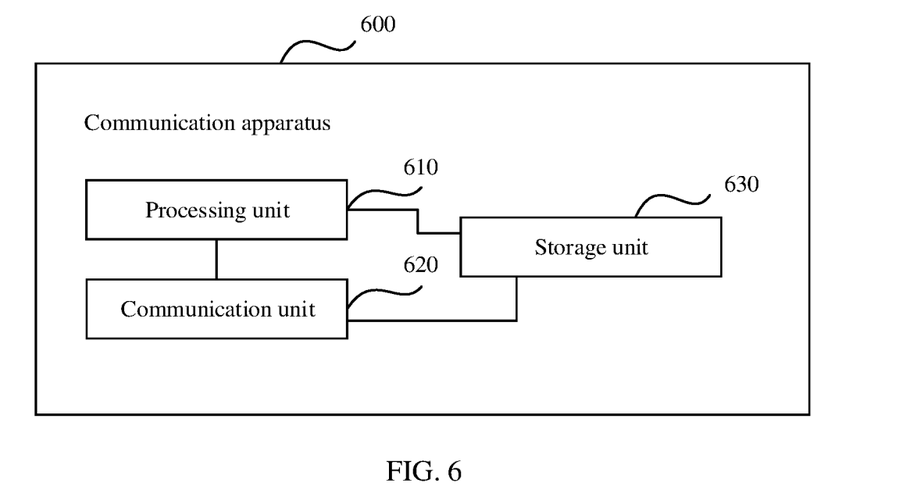
FIG. 6 is a schematic diagram of a structure of a communication apparatus according to an embodiment of this application.

FIG. 6 is a schematic diagram of a structure of a communication apparatus 600 according to an embodiment of this application. It should be understood that the communication apparatus 600 may implement any function corresponding to the terminal device in the embodiment shown in either of FIG. 2 and FIG. 3. The communication apparatus may be a terminal device, or may be a component (for example, a chip or a circuit) that may be configured in the terminal device. The communication apparatus 600 includes a processing unit 610 and a communication unit 620.

It should be noted that the communication unit in this embodiment of this application may also be referred to as a transceiver unit (module), and the processing unit may be referred to as a processing module.

For example, the communication unit 620 is configured to receive configuration information sent by a network device, where the configuration information includes reliability information and CBR information, the reliability information includes information indicating a reliability scope or level, and the CBR information includes information indicating a CBR scope or level.

The processing unit 610 is configured to determine a packet data convergence protocol duplication PDCP duplication processing operation based on service-related information and the configuration information, where the service-related information includes information related to a service corresponding to a PDCP entity, and the processing operation includes an activation operation or a deactivation operation.

In a possible design, the configuration information further includes speed information, and the speed information includes information indicating a speed scope or level of the terminal device.

In a possible design, the service-related information includes reliability information of the service corresponding to the PDCP entity and CBR information of a resource pool corresponding to a current service of the terminal device.

When the communication apparatus 600 is configured to implement the functions corresponding to the terminal device in the embodiment shown in FIG. 3, the communication unit 620 is configured to receive first indication information sent by a network device, where the first indication information includes information indicating a PDCP duplication processing operation corresponding to a first RLC entity or a first logical channel that is associated with a first packet data convergence protocol PDCP entity.

Optionally, the first indication information is carried in a MAC CE.

The processing unit 610 is configured to determine information about an applicable SLRB and/or information about an applicable destination based on the first indication information, and further determine the PDCP duplication processing operation corresponding to the first RLC entity or the first logical channel associated with the first PDCP entity.

Optionally, the communication apparatus 600 may further include a storage unit 630. The storage unit 630 may be configured to store computer-executable instructions, data, and/or other information. The processing unit 610 may read the instructions or the data stored in the storage unit 630, to implement a corresponding solution.

Figure 8:
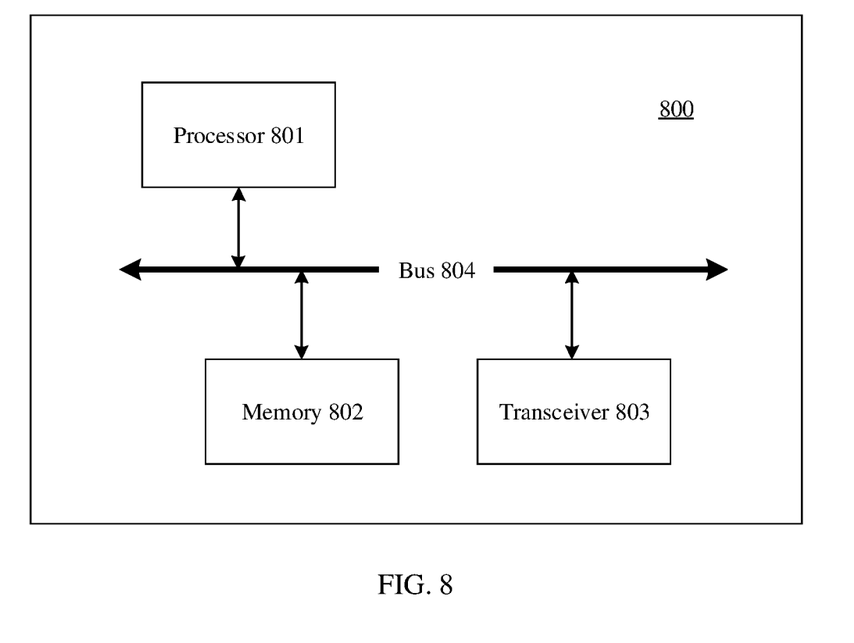
FIG. 8 is a schematic diagram of a structure of a communication apparatus according to an embodiment of this application.

In a possible design, the processing unit 610 may be a processor, for example, a processor 801 shown in FIG. 8. The communication unit 620 may be a transceiver, for example, a transceiver 803 shown in FIG. 8, or the communication unit 620 may be a communication interface. The storage unit 630 may be a memory, for example, 802 shown in FIG. 8.

Figure 7:
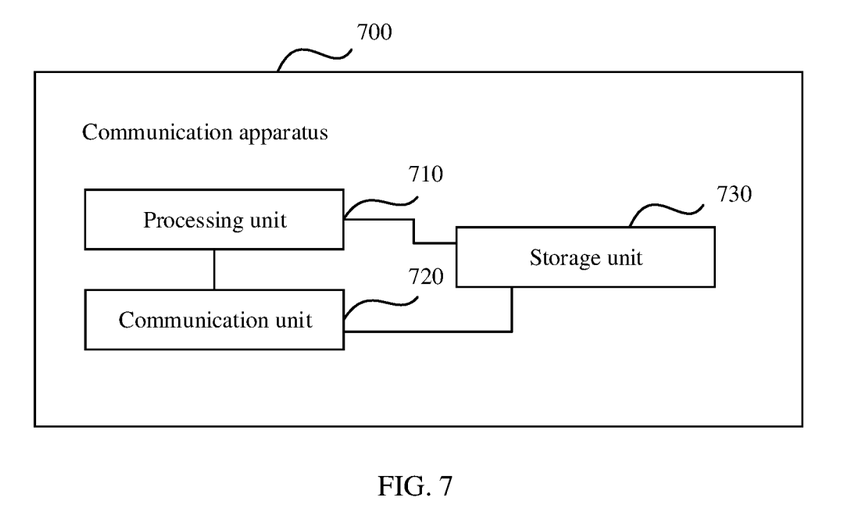
FIG. 7 is a schematic diagram of a structure of a communication apparatus according to an embodiment of this application.

FIG. 7 shows a communication apparatus 700 according to an embodiment of this application. The apparatus 700 may implement any function of the network device in the embodiment shown in either of FIG. 2 and FIG. 3. The communication apparatus may be a network device, or may be a component (for example, a chip or a circuit) that may be configured in the network device.

When the communication apparatus 700 is configured to implement the functions corresponding to the network device in the embodiment shown in FIG. 2, for example, a processing unit 710 is configured to determine configuration information, where the configuration information includes reliability information and channel busy ratio CBR information; and a communication unit 720 is configured to send the configuration information to a terminal device.

For related descriptions of the configuration information, refer to the related descriptions in the foregoing embodiment. Details are not described herein again.

When the communication apparatus 700 is configured to implement the functions corresponding to the network device in the embodiment shown in FIG. 3, a communication unit 720 is configured to send first indication information to a terminal device, where the first indication information includes information indicating a PDCP duplication processing operation corresponding to a first radio link control RLC entity or a first logical channel that is associated with a first packet data convergence protocol PDCP entity.

For related descriptions of the first indication information, refer to the related descriptions in the foregoing embodiment. Details are not described herein again.

Optionally, the processing unit 710 is further configured to flexibly indicate, by using a MAC CE, an RLC entity or a logical channel on which PDCP duplication processing needs to be performed.

Optionally, the communication apparatus 700 may further include a storage unit 730. The storage unit may be configured to store computer-executable instructions, data, and/or other information. The processing unit 710 may read the instructions or the data stored in the storage unit, to implement a corresponding solution.

For a specific interaction procedure and content of information or a message, refer to the descriptions in the corresponding method embodiments.

In a possible design, the processing unit 730 may be a processor, for example, a processor 801 shown in FIG. 8. The communication unit may be a transceiver, for example, a transceiver 803 shown in FIG. 8, or the communication unit may be a communication interface. The storage unit may be a memory, for example, a memory 802 shown in FIG. 8.

It may be understood that the units in the communication apparatus 600 or 700 may be separately disposed, or may be integrated together. This is not limited in embodiments of this application. The units in embodiments of this application may also be referred to as modules. For example, a receiving unit may be referred to as a receiving module.

The "module" or the "unit" in embodiments of this application may be an application specific integrated circuit ASIC, a circuit, a processor that executes one or more software or firmware programs, a memory, an integrated logic circuit, and/or another component that can provide the foregoing functions.

Based on a same technical concept, an embodiment of this application further provides a communication apparatus, configured to implement the functions performed by the network device and the terminal device in the foregoing method embodiments. FIG. 8 is a schematic block diagram of a possible communication apparatus 800 according to an embodiment of this application. The communication apparatus includes at least one processor 801, a memory 802, and optionally includes a transceiver 803 and a system bus 804. The bus 804 may be a PCI bus, an EISA bus, or the like. The bus may be classified into an address bus, a data bus, a control bus, and the like. For ease of representation, only one thick line is for representing the bus in FIG. 8, but this does not mean that there is only one bus or only one type of bus. The transceiver 803 is used by the communication apparatus 800 to communicate and interact with another communication device (for example, a radio access network device or a terminal device, where this is not limited herein), for example, exchange control signaling and/or service data. The transceiver 803 may be implemented by using a circuit that has a communication and transceiver function, a communication interface, or the like. The memory 802 is configured to store needed program instructions and/or data. When the at least one processor invokes the program instructions stored in the memory, and executes the program instructions, the communication apparatus is enabled to implement the functions of the terminal device in the foregoing methods. Alternatively, when the at least one processor invokes the program instructions stored in the memory, and executes the program instructions, the communication apparatus is enabled to implement the functions of the network device in the foregoing methods. The at least one processor 801, the memory 802, and the transceiver 803 are coupled through the system bus 804.

The processor and the transceiver described in embodiments of this application may be implemented on an integrated circuit (IC), an analog IC, a radio frequency integrated circuit RFIC, a hybrid signal IC, an application specific integrated circuit (ASIC), a printed circuit board (PCB), an electronic device, or the like. The processor and the transceiver may also be manufactured by using various IC technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs). Optionally, the processor may include one or more processors, for example, include one or more CPUs. When the processor is one CPU, the CPU may be a single-core CPU or a multi-core CPU. The transceiver is configured to: send data and/or a signal, and receive data and/or a signal. The transceiver may include a transmitter and a receiver. The transmitter is configured to send the data and/or the signal, and the receiver is configured to receive the data and/or the signal. The transceiver may alternatively be a communication interface. The memory includes but is not limited to a random access memory (RAM), a read-only memory (ROM), an erasable programmable read-only memory (EPROM), and a compact disc read-only memory (CD-ROM). The memory is configured to store related instructions and/or data.

In a possible design, the chip mentioned in embodiments of this application may implement a related function that can be implemented by the processor, may implement related functions that can be implemented by the processor and the transceiver, or may implement related functions that can be implemented by the processor, the transceiver, and the memory. The chip may be a field programmable gate array, a dedicated integrated chip, a system on a chip, a central processing unit, a digital signal processing circuit, or a microcontroller for implementing a related function, or may be a programmable controller or another integrated chip.

An embodiment of this application further provides a computer-readable medium. The computer-readable medium stores a computer program. When the computer program is executed by a computer, the communication method in any one of the foregoing method embodiments is implemented.

An embodiment of this application further provides a computer program product. When the computer program product is executed by a computer, the communication method in any one of the foregoing method embodiments is implemented.

This application further provides a communication system. The communication system may include the communication apparatus shown in FIG. 6. Optionally, the communication system may further include the communication apparatus in FIG. 7.

A person skilled in the art may understand that first, second, and various numerals in this application are only for distinguishing for ease of description, and are not for limiting the scope of embodiments of this application. A specific value of a numeral (which may also be referred to as an index), a specific value of a quantity, and a position in this application are only used as examples, but are not unique representation forms, and are not for limiting the scope of embodiments of this application. First, second, and various numerals in this application are also only for distinguishing for ease of description, and are not for limiting the scope of embodiments of this application.

In this application, unless otherwise specified, an element represented in a singular form is intended to represent "one or more", but is not intended to represent "only one". In this application, unless otherwise specified, "at least one" is intended to represent "one or more", and "a plurality of" is intended to represent "two or more".

The term "at least one of" in this specification indicates all or any combination of listed items. For example, "at least one of A, B, and C" may indicate the following six cases: Only A exists, only B exists, only C exists, both A and B exist, both B and C exist, and A, B, and C all exist. A may be singular or plural, B may be singular or plural, and C may be singular or plural.

It should be understood that sequence numbers of the foregoing processes do not mean execution sequences in various embodiments of this application. The execution sequences of the processes should be determined based on functions and internal logic of the processes, and should not constitute a limitation on implementation processes of embodiments of the present invention.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the foregoing apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The correspondences shown in the tables in this application may be configured, or may be predefined. Values of the information in the tables are merely examples, and other values may be configured. This is not limited in this application. When a correspondence between the information and the parameters is configured, not all the correspondences shown in the tables need to be configured. For example, in the tables in this application, correspondences shown in some rows may alternatively not be configured. For another example, proper deformations and adjustments such as splitting and combination may be performed based on the foregoing tables. Names of the parameters shown in titles of the foregoing tables may alternatively be other names that can be understood by a communication apparatus, and values or representation manners of the parameters may alternatively be other values or representation manners that can be understood by the communication apparatus. During implementation of the foregoing tables, another data structure, such as an array, a queue, a container, a stack, a linear table, a pointer, a linked list, a tree, a graph, a structure, a class, a pile, or a hash table, may alternatively be used.

"Predefine" in this application may be understood as "define", "predefine", "store", "pre-store", "pre-negotiate", "pre-configure", "solidify", or "pre-burn".

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions in this application essentially, the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   receiving, by a terminal device, configuration information sent by a network device, wherein the configuration information comprises reliability information, channel busy ratio (CBR) information, and speed information, wherein the reliability information comprises information indicating a reliability scope or level, wherein the CBR information comprises information indicating a CBR scope or level, and wherein the speed information comprises information indicating a speed scope or level of the terminal device; and
   determining, by the terminal device, a packet data convergence protocol (PDCP) duplication processing operation based on service-related information and the configuration information, wherein the service-related information comprises information related to a service corresponding to a PDCP entity, and wherein the processing operation comprises an activation operation or a deactivation operation,
   wherein the service-related information comprises the speed information of the terminal device, reliability information of the service corresponding to the PDCP entity, and CBR information of a resource pool corresponding to a current service of the terminal device, and
   wherein determining the PDCP duplication processing operation comprises that, when a reliability requirement satisfies a first condition, and the CBR information of the resource pool satisfies a second condition, and the speed information of the terminal device satisfies a third condition, the terminal device determines to activate the PDCP duplication processing operation of the corresponding PDCP entity.

2. The method according to claim 1, wherein the service-related information further comprises PDCP duplication indication information in a sidelink radio bearer (SLRB) configuration.

3. The method according to claim 1, wherein the reliability information comprises at least one reliability scope or level, wherein the CBR information comprises at least one CBR scope or level, and the reliability scope or level and the CBR scope or level correspond to each other.

4. The method according to claim 1, wherein the service corresponding to the PDCP entity comprises one or more of a data packet or a quality of service flow that are mapped to the PDCP entity.

5. The method according to claim 1, wherein the configuration information is carried in a system information broadcast (SIB) message.

6. A method, comprising:
   determining, by a network device, configuration information, wherein the configuration information comprises reliability information, channel busy ratio (CBR) information, and speed information, wherein the reliability information comprises information indicating a reliability scope or level, and wherein the CBR information comprises information indicating a CBR scope or level, and wherein the speed information comprises information indicating a speed scope or level of a terminal device; and
   sending, by the network device, the configuration information to the terminal device,
   wherein the configuration information is used by the terminal device to determine a packet data convergence protocol (PDCP) duplication processing operation such that, when a reliability requirement of a service corresponding to a PDCP entity satisfies a first condition, and the CBR information of a resource pool corresponding to a current service of the terminal device satisfies a second condition, and the speed information of the terminal device satisfies a third condition, the terminal device determines to activate the PDCP duplication operation of the corresponding PDCP entity.

7. The method according to claim 6, wherein the reliability information comprises at least one reliability scope, wherein the CBR information comprises at least one CBR scope, and wherein the reliability scope and the CBR scope correspond to each other.

8. The method according to claim 6, wherein the configuration information is carried in a system information broadcast (SIB) message, a radio resource control (RRC) dedicated message, or a preconfigured message.

9. An apparatus comprising:
   at least one processor; and
   a memory, wherein the at least one processor is coupled to the memory, the memory contains instructions that, when executed by the at least one processor, cause the apparatus to:
   receive configuration information sent by a network device, wherein the configuration information comprises reliability information, channel busy ratio (CBR) information, and speed information, wherein the reliability information comprises information indicating a reliability scope or level, and wherein the CBR information comprises information indicating a CBR scope or level, and wherein the speed information comprises information indicating a speed scope or level of the apparatus; and
   determine a packet data convergence protocol (PDCP) duplication processing operation based on service-related information and the configuration information, wherein the service-related information comprises information related to a service corresponding to a PDCP entity, and wherein the processing operation comprises an activation operation or a deactivation operation, wherein the service-related information comprises the speed information of the apparatus, reliability information of the service corresponding to the PDCP entity, and CBR information of a resource pool corresponding to a current service of the apparatus, and wherein to determine the PDCP duplication processing operation comprises that, when a reliability requirement satisfies a first condition, and the CBR information of the resource pool satisfies a second condition, and the speed information of the apparatus satisfies a third condition, the apparatus determines to activate the PDCP duplication processing operation of the corresponding PDCP entity.

10. The apparatus according to claim 9, wherein the service-related information further comprises PDCP duplication indication information in a sidelink radio bearer (SLRB) configuration.

11. The apparatus according to claim 9, wherein the reliability information comprises at least one reliability scope or level, wherein the CBR information comprises at least one CBR scope or level, and wherein the reliability scope or level and the CBR scope or level correspond to each other.

12. The apparatus according to claim 9, wherein the service corresponding to the PDCP entity comprises one or more of a data packet and a quality of service flow that are mapped to the PDCP entity.

13. The apparatus according to claim 9, wherein the configuration information is carried in a system information broadcast (SIB) message.

14. The method according to claim 6, wherein the service corresponding to the PDCP entity comprises one or more of a data packet or a quality of service flow that are mapped to the PDCP entity.

15. The method according to claim 1, wherein the configuration information is carried in a radio resource control (RRC) dedicated message.

16. The method according to claim 1, wherein the configuration information is carried in a preconfigured message.

17. The apparatus according to claim 9, wherein the configuration information is carried in a radio resource control (RRC) dedicated message.

18. The apparatus according to claim 9, wherein the configuration information is carried in a preconfigured message.

19. The apparatus according to claim 9, wherein the apparatus is a terminal device.

* * * * *